United States Patent [19]

Lewison

[11] 4,177,865
[45] Dec. 11, 1979

[54] CULTIVATOR TOOL SHANK ASSEMBLY

[75] Inventor: Howard L. Lewison, Hutchinson, Minn.

[73] Assignee: Dynamics Corporation of America, Greenwich, Conn.

[21] Appl. No.: 894,361

[22] Filed: Apr. 7, 1978

[51] Int. Cl.² ............................................. A01B 35/24
[52] U.S. Cl. .................................. 172/705; 267/20 A
[58] Field of Search ............... 172/705, 707, 708, 710, 172/551, 572, 573; 267/60, 61, 20 R, 20 A, 170, 179, 166, 175

[56] References Cited

U.S. PATENT DOCUMENTS

| 2,277,322 | 3/1942 | Heaslet | 267/60 |
|---|---|---|---|
| 3,098,529 | 7/1963 | Wade | 172/705 X |
| 3,258,076 | 6/1966 | Groenke | 172/705 |
| 3,480,086 | 11/1969 | Groenke | 172/705 |
| 3,493,055 | 2/1970 | Van Peursem | 172/705 |
| 3,700,038 | 10/1972 | Essex | 172/705 |
| 3,700,039 | 10/1972 | Essex | 172/705 |
| 3,981,367 | 9/1976 | Mydels | 172/705 |
| 4,011,916 | 3/1977 | Neal | 172/710 |

FOREIGN PATENT DOCUMENTS

| 87803 | 9/1958 | Denmark | 172/710 |
|---|---|---|---|
| 731210 | 5/1932 | France | 172/705 |

OTHER PUBLICATIONS

Advertising Brochure Koehring, 1972, Appleton, Wisc., Brady 2500 Widewing Field Cult.
Advertising Brochure Glencoe Model SS, Glencoe, Minn. 9/1972.

*Primary Examiner*—Richard J. Johnson
*Attorney, Agent, or Firm*—Schroeder, Siegfried, Ryan, Vidas, Steffey & Arrett

[57] ABSTRACT

This invention relates to a cultivating shank assembly in which a mounting frame is comprised of a mounting frame portion and a tool shank support portion pivoted thereon. The mounting frame portion and the tool support portion are formed of plates which are held together by suitable transversely extending plates which support the mounting frame on a cultivating tool bar and mount the tool shank respectively. A compression spring for the mounting assembly is connected between the tool shank portion and the mounting frame portion of the mounting frame and is guided between inner and outer cylindrical spring retainers which are pivoted respectively on the tool shank support portion and the mounting frame portion to prevent the compression spring from buckling and to guide the same such that the compressive force will always be applied along the extent of the spring. Suitable apertures in the mounting frame portion provide a limit stop to define the pitch adjustment of the tool shank and provide preload adjustment for the compression spring.

7 Claims, 2 Drawing Figures

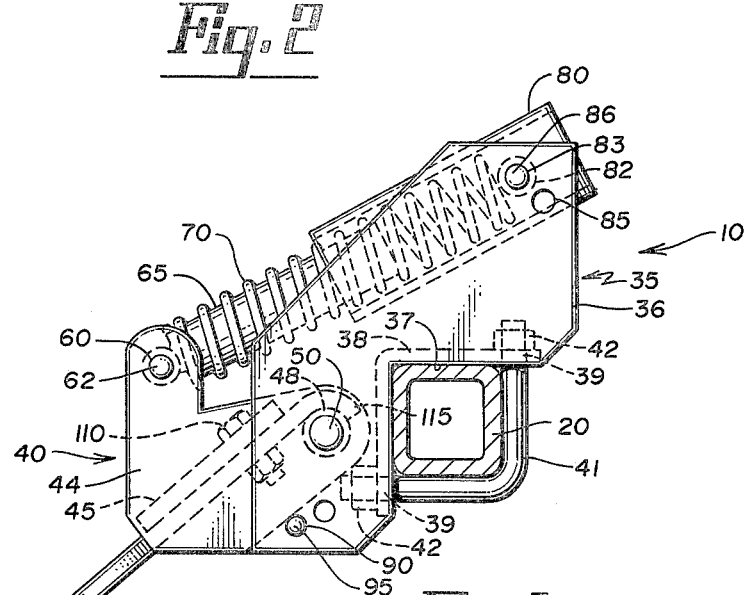

CULTIVATOR TOOL SHANK ASSEMBLY

FIELD OF INVENTION

This invention relates to a cultivator tool shank assembly and more particularly to an improved cultivator shank assembly for mounting varying types of cultivating tools which is simplified in design and includes adjustability for controlling the preload of the trip spring and adjustability of the pitch of the tool shank.

Prior designs of cultivating tool shank mounting assemblies have taken varying forms and have utilized various degrees and types of adjustments. Working conditions for such tools have required a spring bias mounting for the tool shank to permit the tool mounted thereon to swing clear of obstructions when they are encountered in a cultivating operation to prevent breakage of the shank or tool thereon. Further, different soil conditions require different depth adjustments of the cultivating tool, and it is recognized that individual assemblies should contain both adjustment of the spring and adjustment of the pitch of the tool shank to meet these requirements. Such adjustment features in the prior designs have resulted in complex structures which increase the cost of the same and add to the complexity of the adjustment. Further, in most of these prior designs, the pivoting of the tool shank to clear an obstruction places a force on the bias spring in compressing the same that is not always aligned with the extent of the spring causing a tendency for the spring to buckle and cause variation in the tripping force or height necessary for the shank and tool to clear obtacles. The U.S. Pat. Nos. to Groenke, 3,258,076; 3,480,085; Essex, 3,700,038; Essex et al 3,700,039; and Mydels 3,981,367 are examples of such prior structures.

SUMMARY OF THE INVENTION

The improved cultivating tool shank assembly of the present invention provides an arrangement for mounting a curved tool shank with a tool thereon on a cultivator frame with adjustments for preload of the compression spring and adjustment of the angle of the shank assembly for pitch adjustment of the tool relative to the cultivating frame. The assembly includes a mounting frame formed of a mounting frame portion and a tool shank support portion. The mounting frame portion is formed of a pair of spaced plate members having a notch therein to permit mounting of the frame on a cultivating frame bar. A portion of the mounting frame is positioned above and forward the frame bar and another portion is positioned to the rear and below the frame bar for the normal mounting of the mounting frame on a cultivating frame bar. The tool shank portion is pivotally mounted on one end of the mounting frame portion rearward of the cultivating frame bar, and it includes a support for the tool shank which extends rearwardly therefrom. A bias or trip type compression spring is pivotally mounted on the tool shank portion through a guide cylinder which retains the shape of the compression spring. An outer cylindrical spring guide or retainer mounts the opposite end of the compression spring in the upper and forwardextending mounting frame portions of the mounting frame. The upper cylindrical spring guide includes a bearing member which captivates the free end of the compression spring and permits mounting of the spring guide in one of the plurality of series of adjustment holes in the upper end of the mounting end portion to adjust the preload of a compression spring. The lower portion of the mounting frame has a plurality of staggered apertures therein through which a stop pin may be selectively positioned to adjust the pitch of the cultivating tool shank. This stop pin, which is positioned in the mounting frame portion, limits the movement of the tool shank portion of the mounting relative to the mounting frame to which the former is biased through the action of the compression spring. The compression spring provide the bias and permits the trip action of the shank assembly when obstructions are encountered. The simplified arrangement of parts permits a simplified adjustment of preload and pitch angle. The compression spring is captivated between an inner and outer cylindrical guide which are pivotly mounted on the tool shank portion and the mounting frame portion to insure that the force compressing the spring will always be applied along the extent of the spring for uniformity in spring bias. This will accurately control the trip height adjustment of the assembly.

IN THE DRAWINGS

FIG. 1 is a side elevation view of the improved cultivating tool shank assembly; and, FIG. 2 is a perspective view of the cultivating tool shank assembly on a cultivator frame.

DESCRIPTION OF PREFERRED EMBODIMENT

The improved cultivating tool shank is shown in the drawings generally at 10. The assembly is normally used with a plurality of such assemblies which are generally mounted in a spaced and side by side relationship on cultivating tool mounting bars of a cultivator type implement, such as is indicated generally at 20. The improved mounting assembly includes a mounting frame formed of a mounting frame portion, indicated generally at 35, and a tool shank portion, indicated generally at 40, which is pivotally mounted on the mounting frame portion. The mounting frame portion 35 is composed of a pair of side plate members 36 which have a V-shaped notch 37 positioned intermediate the extent of the same and symmetrical in each plate member. Positioned in the notch and welded thereto is a V-shaped plate member 38. The plate member 38 has a right angle bend therein to fit into the V-shaped notch and it is designed to position the mounting frame on the cultivating tool mounting bar 20 which is normally square or rectangular in cross section. Plate member 38 has pairs of mounting holes 39 near the ends of the same and a pair of L-shaped bolt members 41 fit around the mounting frame bar 20 and extend through the apertures 39 to be secured thereto through nuts 42.

The tool shank portion 40 of the mounting assembly is similarly formed of a pair of side plates 44 which are generally L-shaped in configuration and have a support plate 45 positioned therebetween and secured thereto intermediate the extent of the side plates. One end of the tool shank portion has a cylindrical journal member 48 positioned between the side plates 44 and suitably welded thereto with apertures in the side plates to permit the passage of a journal pin 50 through the journal member. The tool shank support is mounted on the mounting frame portion 35 through the pin 50, which passes through apertures in the side plates 36 of the mounting frame portion and through the apertures in the side plates 44 of the tool shank portion to journal the cylindrical journal member thereon, pivotally mounting the tool shank portion to the mounting frame portion of the mounting frame. When the mounting frame portion is positioned on a cultivator tool mounting bar, the side plates extend above and slightly forward of the mounting frame in the normally operating position of the cultivator with the lower portion extending to the rear and slightly below the mounting frame bar. The tool shank portion is pivoted on the lower or rear end of the mounting frame portion and extends to the rear of the cultivator mounting bar to support a cultivating tool shank, to be later identified, thereon.

The opposite end of the plates 44 forming the tool shank portion has a second cylindrical journal member 60 which is aligned with apertures in the plates. This journal member is adapted to be supported on a journal pin 62 positioned through the apertures in the plates 44 to pivot the compression spring thereon. Attached to the journal member 60, as by welding, is a cylindrical spring former 65 which is designed to pivot with the journal member between the side plates 44 of the tool shank portion. The tool shank portion 40 with the journal members 48 and 60 and the shank support plate 45 therein has a width dimension such as to fit the spacing between the plates 36 of the mounting frame portion to freely pivot thereon. A compression spring 70 is positioned around the cylindrical spring former 65 and one end of the compression spring bears against the journal member 60 as it is pivoted on the side plates through the pin 62. The compression spring closely fits around the cylindrical exterior of the former 65 so as to prevent the coils therein from buckling as the spring is compressed. The opposite end of the compression spring 70 is housed in an outer spring retainer 80 which is cylindrical in form and which has a diametrical dimension to fit over the helical compression spring 70. The outer spring retainer cooperates with the inner spring retainer to encircle the spring and captivate the same such that it will not buckle when compressed. The outer spring retainer has a journal member 82 welded along the extent of the same. Apertures 83 in the walls of the cylindrical retainer are aligned therewith for the purposes of mounting the retainer in the upper end of the mounting frame portion 35. The end of the compression spring bears against the journal member 82 and the distance between the inner spring former 65 and the journal member is slightly greater than the amount of compression that will be experienced by the spring as the tool support portion is pivoted upon the engagement of an obstacle of the tool mounted on the tool shank. The upper end of the mounting frame portion 35 has a series of apertures 85 therein through which suitable pin 86 is positioned to mount the journal member 82 of the spring retainer in the upper portion of the mounting frame. This permits the spring retainer and hence the spring to be pivoted therein. The various apertures 85 in the upper portion of the mounting frame provide for the preload adjustment of the spring or the compression of the same in the normal or unpivoted position of the tool shank portion.

In the lower portion of the mounting frame there are a plurality of spaced and aligned apertures 90 in plate member 36 which are located below the pivot pin 50 in the mounting frame portion which pivots the tool shank portion thereon. A suitable stop pin 95 is positioned through one of the sets of apertures in the side plate members 36 to form a stop against which the tool shank portion or its plates will bear. This defines the limit of pivot of the tool shank portion and the angle of pitch of the tool shank and the tool mounted thereon. Adjustment of the angle of pitch will be obtained by moving the pin 95 through one or the other of the sets of apertures 90 to vary the limit position of the tool shank portion. The compression spring 70 will bias the tool shank portion against the stop pin 95 to define this pitch angle.

The tool shank is shown at 100 as a curved element which is mounted on the support plate 45 in the tool shank portion 40. Suitable apertures in the support plate 45 permit the positioning of bolts 110 therethrough and through a corresponding aperture in the tool shank to secure the tool shank 100 to the tool shank portion of the mounting frame. The end of the tool shank is curved, as at 115, and is positioned around the journal member 48 in the tool shank portion to additionally support the end of the tool shank in the tool shank portion. By adjusting the pins 95, the biased position of the tool shank portion relative to the mounting frame portion is determined, thereby adjusting the angle which the end of the tool shank makes with the ground for adjusting the pitch of the cultivating tool to be mounted thereon. In FIG. 1, a suitable cultivating tool is shown at 120 which is conventionally bolted at the end of the tool shank. The cultivating tool may take varying forms and is supported on the tool shank for ground working purposes.

In the installation of the improved cultivating shank assembly, the mounting frame is secured to the cultivator tool bar 20 by positioning the mounting frame over the tool bar and securing the bolt members around the same. The bolt members are secured to the mounting frame through the nuts 42 to mount the mounting frame on the tool bar. The tool shank will normally have been applied to the tool shank portion and secured thereon and thereafter, the pitch adjustment of the tool shank will be determined by the positioning of the pin 95 in one of the sets of holes in the mounting frame portion. With the pitch adjustment set, the preload of the spring may be adjusted by positioning the pivot pin 86 in one of a series or pairs of apertures 85 in the upper portion of the mounting frame and thereby compressing the spring to the desired preload. Thereafter, in use, the tool shank will pivot upon the engagement of the working tool with an object on the ground during the cultivating operation when the force applied thereto reaches a sufficient trip level to overcome the compression force of the spring, allowing the tool shank to pivot.

In considering the invention it should be remembered that the disclosure is illustrative only and the scope of the invention should be determined by the appended claims.

What I claim is:

1. A cultivating shank assembly comprising, a tool shank adapted to have a cultivating tool mounted on one end of the same, a mounting frame for said assembly including a mounting portion and a tool shank support portion, said mounting portion of the mounting frame being formed of a pair of spaced plate members said mounting frame portion being adapted to be mounted on a transversely extending frame bar of a cultivator with the mounting frame portion extending forward and above the cultivating frame bar at one end and to the rear of the transversely extending frame bar at the other end, said tool shank portion having the tool shank mounted thereon, means included in the tool shank portion for pivotally mounting one end of the tool shank portion on the mounting portion of the mounting frame, a pressure rod pivotally attached to the other end of the tool shank portion, a compression bias spring positioned around the pressure rod with one end bearing against the tool shank portion, a cylindrical spring retainer encircling the spring at the other end, said spring retainer being pivotally mounted at the forward end of the mounting frame portion between the plate members, said pressure rod terminating within said cylindrical spring retainer said cylindrical spring retainer being comprised of a cylindrical member having a diametrical dimension such as to fit around the spring and the cylindrical member forming the pressure rod, and including a journal member positioned in one end of the cylindrical spring retainer against which the other end of the spring abuts with the journal member being retained in the plate members of the mounting frame portion by means of a pin positioned through a pair of apertures therein.

2. The cultivating tool assembly of claim 1 in which the tool shank portion includes a pair of spaced plates with a support plate positioned therebetween and connected thereto to mount the tool shank.

3. The cultivating shank assembly of claim 2 in which the tool shank portion includes a cylindrical journal member extending between the spaced plates adapted to cooperate with a pivot pin extending through the spaced plate members of the mounting frame to pivot the tool shank portion thereon.

4. The cultivating shank assembly of claim 2 in which the pressure rod is a cylindrical member having a journal member positioned at one end for pivotally attaching the pressure rod to the plates of the tool shank portion to pivot the pressure rod thereon.

5. The cultivating shank assembly of claim 1 in which the tool shank has a curved extremity adapted to fit around the journal member which pivotally mounts the tool shank portion on the mounting frame portion.

6. The cultivating shank assembly of claim 1 in which the tool shank is mounted in the tool shank portion through nut and bolt means which secure the tool shank to the support plate therein.

7. The cultivating shank assembly of claim 1 and including means for securing the mounting frame portion to the cultivating frame bar.

* * * * *